Patented July 11, 1933

1,918,222

UNITED STATES PATENT OFFICE

LOUIS WEISBERG AND WILLARD F. GREENWALD, OF NEW YORK, N. Y., ASSIGNORS TO WEISBERG & GREENWALD, INC., OF NEW YORK, N. Y., A CORPORATION OF NEW YORK

METHOD OF PRODUCING SYNTHETIC RESINS AND PRODUCTS THEREOF

No Drawing. Application filed March 31, 1931. Serial No. 526,760.

This invention relates to the production of synthetic resins.

It is the object of the invention to provide a method of producing resins and improved resin products.

The invention depends upon the reaction of triethanolamine with suitable acids under regulated conditions. Various acids may be used either alone or in combination. For example, phthalic anhydride is a suitable acid and when combined with triethanolamine it produces a resin which is satisfactory for many uses. Other acids which may be used are, for example, oleic, citric, tartaric, maleic, malic and fumaric. It is desirable also to employ combinations of these acids, and particularly to replace a part of the phthalic anhydride with one or more of the aliphatic acids since the use of these acids tends to produce tougher resins which are less brittle and less susceptible to moisture.

In carrying out the invention, we mix suitable proportions of triethanolamine and an acid such as phthalic anhydride and heat the mixture to a suitable temperature, which may vary from about 100° C. upward to 220 or 230° C. The reaction is usually conducted at atmospheric pressure. If a part of the phthalic anhydride is replaced with an aliphatic acid, the latter is preferably added after the phthalic anhydride is dissolved and the temperature is reduced to prevent foaming, caused presumably by the release of water by the reaction. The temperature may then be raised gradually until the reaction is complete.

Although we prefer to use phthalic anhydride in part at least as the acid ingredient, other acids or mixtures thereof may be used, particularly those aliphatic acids hereinbefore mentioned. Moreover, triethanolamine may be replaced in part by other polyhydric alcohols such as glycerol and glycol, which are known to react with acids to form resins.

As examples of the invention, the following will serve to illustrate the preferred procedure:

143 parts of triethanolamine and 222 of phthalic anhydride are heated to 150° C. After all the phthalic anhydride is dissolved, 64 parts of citric acid are added. The temperature is then reduced to 110°, because there is considerable foaming. The temperature is gradually brought back to 150° as the foaming diminishes. The total time of heating is approximately two hours. The reaction can be carried out much more rapidly at higher temperatures, but the difficulty with foaming is increased.

Another example is as follows:

Triethanolamine, 64 parts; phthalic anhydride, 155; oleic acid, 18. The mixture is heated at 150° C., oleic acid being left out until after reaction between the other components has taken place. The total heating time with this mixture is a little over an hour, the difference being due to the fact that there is less foaming.

The reaction products are resins having properties similar to other synthetic resins of similar character. They differ, however, in chemical constitution, being reaction products in whole or part of triethanolamine. These products can be employed generally in the arts for purposes to which synthetic resins are adapted.

Various changes may be made in the procedure and materials employed in the reaction to produce resins of varying characteristics, without departing from the invention or sacrificing any of the advantages thereof.

We claim:

1. A synthetic resin including the reaction product of triethanolamine with an organic carboxylic acid.

2. A synthetic resin consisting of the reaction product of triethanolamine with an organic carboxylic acid.

3. A synthetic resin including the reaction product of triethanolamine with phthalic anhydride.

4. A synthetic resin including the reaction product of triethanolamine with phthalic anhydride, and an aliphatic carboxylic acid.

5. A synthetic resin including the reaction product of triethanolamine with a polybasic organic carboxylic acid.

6. A synthetic resin consisting of the reaction products of polyhydric alcohols including triethanolamine with an organic carboxylic acid.

7. A synthetic resin consisting of the reaction products of polyhydric alcohols including triethanolamine with a polybasic organic carboxylic acid.

8. A synthetic resin consisting of the reaction products of polyhydric alcohols including triethanolamine with phthalic anhydride.

9. A synthetic resin consisting of the reaction products of polyhydric alcohols including triethanolamine with phthalic anhydride and an aliphatic carboxylic acid.

10. A synthetic resin consisting of the reaction product of triethanolamine with a polybasic organic carboxylic acid.

11. The method of producing synthetic resins which comprises heating a mixture of triethanolamine with a polybasic organic carboxylic acid.

12. The method of producing synthetic resins which comprises heating a mixture of triethanolamine with phthalic anhydride.

13. The method of producing synthetic resins which comprises heating a mixture of triethanolamine with phthalic anhydride and an aliphatic carboxylic acid.

14. The method of producing synthetic resins which comprises heating a mixture of triethanolamine with a mixture of organic carboxylic acids including a polybasic acid.

15. The method of producing synthetic resins which comprises heating a mixture of triethanolamine with phthalic anhydride until the phthalic anhydride is dissolved, adding an organic carboxylic acid, reducing the temperature to avoid foaming, and thereafter increasing the temperature until the reaction is complete.

16. A synthetic resin including the reaction products of triethanolamine with phthalic anhydride and an organic carboxylic acid.

17. A synthetic resin consisting of the reaction products of polyhydric alcohols including triethanolamine with phthalic anhydride and an organic carboxylic acid.

18. A synthetic resin consisting of the reaction products of triethanolamine with phthalic anhydride and an organic carboxylic acid.

19. The method of producing synthetic resins which comprises heating a mixture of triethanolamine with an organic carboxylic acid.

20. The method of producing synthetic resins which comprises heating a mixture of polyhydric alcohols including triethanolamine with an organic carboxylic acid.

21. A synthetic resin consisting of the reaction product of triethanolamine and one or more acids from the group consisting of phthalic anhydride, oleic, citric, tartaric, maleic, malic and fumaric acids.

22. The method of producing synthetic resins which comprises heating a mixture of triethanolamine and one or more of the acids of the group consisting of phthalic anhydride, oleic, citric, tartaric, maleic, malic and fumaric acids.

In testimony whereof we affix our signatures.

LOUIS WEISBERG.
WILLARD F. GREENWALD.

DISCLAIMER 1,918,222.—*Louis Weisberg* and *Willard F. Greenwald*, New York, N. Y. METHOD OF PRODUCING SYNTHETIC RESINS AND PRODUCTS THEREOF. Patent dated July 11, 1933. Disclaimer filed October 3, 1936, by the assignee, *General Electric Company*.

Hereby disclaims claims 1, 2, 3, 4, 5, 10, 11, 12, 13, 14, 16, 18, 19, 21, and 22 of said patent.

[*Official Gazette November 10, 1936.*]

action products of polyhydric alcohols including triethanolamine with an organic carboxylic acid.

7. A synthetic resin consisting of the reaction products of polyhydric alcohols including triethanolamine with a polybasic organic carboxylic acid.

8. A synthetic resin consisting of the reaction products of polyhydric alcohols including triethanolamine with phthalic anhydride.

9. A synthetic resin consisting of the reaction products of polyhydric alcohols including triethanolamine with phthalic anhydride and an aliphatic carboxylic acid.

10. A synthetic resin consisting of the reaction product of triethanolamine with a polybasic organic carboxylic acid.

11. The method of producing synthetic resins which comprises heating a mixture of triethanolamine with a polybasic organic carboxylic acid.

12. The method of producing synthetic resins which comprises heating a mixture of triethanolamine with phthalic anhydride.

13. The method of producing synthetic resins which comprises heating a mixture of triethanolamine with phthalic anhydride and an aliphatic carboxylic acid.

14. The method of producing synthetic resins which comprises heating a mixture of triethanolamine with a mixture of organic carboxylic acids including a polybasic acid.

15. The method of producing synthetic resins which comprises heating a mixture of triethanolamine with phthalic anhydride until the phthalic anhydride is dissolved, adding an organic carboxylic acid, reducing the temperature to avoid foaming, and thereafter increasing the temperature until the reaction is complete.

16. A synthetic resin including the reaction products of triethanolamine with phthalic anhydride and an organic carboxylic acid.

17. A synthetic resin consisting of the reaction products of polyhydric alcohols including triethanolamine with phthalic anhydride and an organic carboxylic acid.

18. A synthetic resin consisting of the reaction products of triethanolamine with phthalic anhydride and an organic carboxylic acid.

19. The method of producing synthetic resins which comprises heating a mixture of triethanolamine with an organic carboxylic acid.

20. The method of producing synthetic resins which comprises heating a mixture of polyhydric alcohols including triethanolamine with an organic carboxylic acid.

21. A synthetic resin consisting of the reaction product of triethanolamine and one or more acids from the group consisting of phthalic anhydride, oleic, citric, tartaric, maleic, malic and fumaric acids.

22. The method of producing synthetic resins which comprises heating a mixture of triethanolamine and one or more of the acids of the group consisting of phthalic anhydride, oleic, citric, tartaric, maleic, malic and fumaric acids.

In testimony whereof we affix our signatures.

LOUIS WEISBERG.
WILLARD F. GREENWALD.

DISCLAIMER 1,918,222.—*Louis Weisberg* and *Willard F. Greenwald*, New York, N. Y. METHOD OF PRODUCING SYNTHETIC RESINS AND PRODUCTS THEREOF. Patent dated July 11, 1933. Disclaimer filed October 3, 1936, by the assignee, *General Electric Company*.

Hereby disclaims claims 1, 2, 3, 4, 5, 10, 11, 12, 13, 14, 16, 18, 19, 21, and 22 of said patent.

[*Official Gazette November 10, 1936.*]

DISCLAIMER 1,918,222.—*Louis Weisberg* and *Willard F. Greenwald*, New York, N. Y. METHOD OF PRODUCING SYNTHETIC RESINS AND PRODUCTS THEREOF. Patent dated July 11, 1933. Disclaimer filed October 3, 1936, by the assignee, *General Electric Company*.

Hereby disclaims claims 1, 2, 3, 4, 5, 10, 11, 12, 13, 14, 16, 18, 19, 21, and 22 of said patent.

[*Official Gazette November 10, 1936.*]